A. J. WHITBECK.
SELF HEATING SOLDERING IRON.
APPLICATION FILED APR. 11, 1910.
991,122.
Patented May 2, 1911.
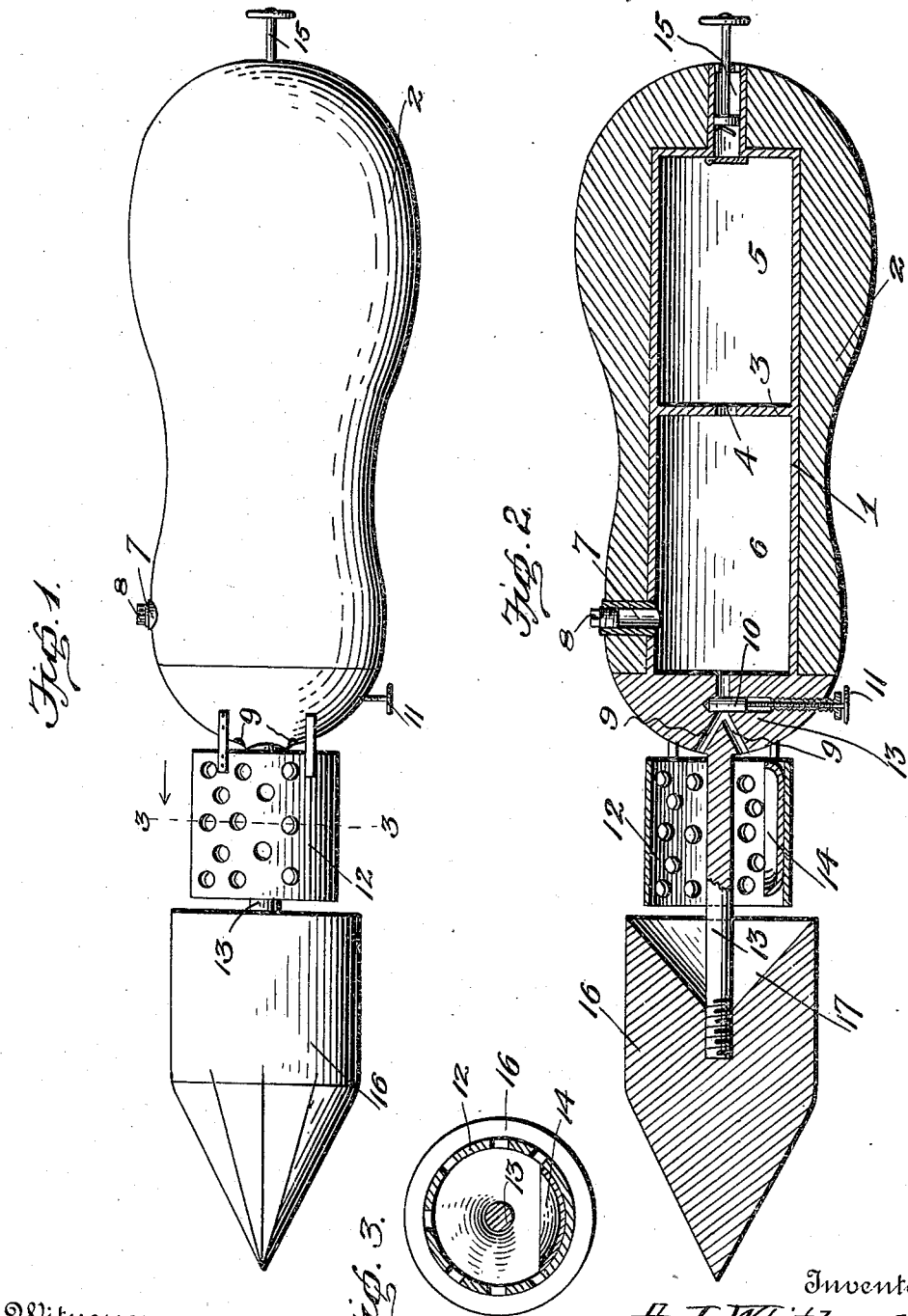
Witnesses
E. E. Hunt.
C. H. Griesbauer.
Inventor
A. J. Whitbeck
by H. B. Willson & Co.
Attorneys

UNITED STATES PATENT OFFICE.

ARTHUR J. WHITBECK, OF NEW BRITAIN, CONNECTICUT.

SELF-HEATING SOLDERING-IRON.

991,122. Specification of Letters Patent. Patented May 2, 1911.

Application filed April 11, 1910. Serial No. 554,837.

*To all whom it may concern:*

Be it known that I, ARTHUR J. WHITBECK, a citizen of the United States, residing at New Britain, in the county of Hartford and State of Connecticut, have invented certain new and useful Improvements in Self-Heating Soldering-Irons; and I do declare the following to be a full, clear, and exact description of the invention, such as will enable others skilled in the art to which it appertains to make and use the same.

This invention relates to improvements in self-heating soldering irons.

The object of the invention is to provide a soldering iron of this character having an improved construction and arrangement of the burner and means whereby the preliminary heating of the same is accomplished.

With the foregoing and other objects in view, the invention consists of certain novel features of construction, combination and arrangement of parts as will be more fully described and particularly pointed out in the appended claims.

In the accompanying drawings, Figure 1 is a side view of a soldering iron constructed in accordance with the invention; Fig. 2 is a vertical longitudinal section of the same; Fig. 3 is a cross section on the line 3—3 of Fig. 1.

My improved soldering iron comprises a tubular body portion 1 formed of any suitable metal and covered with wood, which is shaped to form the handle 2. The tubular body portion 1 is preferably divided midway between its ends by a partition 3 having formed therein a centrally disposed passage 4. The partition 3 divides the tubular body portion into two chambers 5 and 6 so that, when the device is in use, the gasolene will not flood the air inlet, it being understood that unless the point or head is elevated the gasolene will not reach the opening in the partition. To the chamber 6 is connected a filling tube 7 which extends through the side of the wooden handle portion and is closed at its outer end by a suitable plug or cap 8.

In the forward end of the chamber 6 are arranged vapor discharging passages 9, the flow through which is controlled by a needle valve 10, the stem of which has a threaded engagement with its seat and extends through the side of the body and is provided with a hand wheel 11. The vapor discharging passages 9 communicate at their outer ends with a combined mixer and burner 12, which consists of a short section of perforated tubing secured to the shank 13 of the tool, said shank forming a continuation of the outer end of the body portion 1, as shown.

In the mixer 12 and preferably secured to one side thereof is a shallow saucer or receptacle 14, which is adapted to receive a small quantity of gasolene which is ignited therein, and thus provides for the preliminary heating of the burner and the end of the body so that the gasolene spray or vapor, when injected into the same, will immediately become volatilized and mix with air to form a gas which will burn in a blue flame at the end of the burner.

The gasolene is forced from the chamber 6 in the form of a vapor or fine spray by means of compressed air which is forced into the chamber 5 by a suitable air pump 15 arranged in the end of the handle and connected with the end of the chamber 5, as shown. The end of the shank 13 is preferably threaded and on said threaded end is adapted to be secured a soldering iron head or point 16. The inner end of the head 16 is preferably recessed, as shown at 17, to receive the flame from the end of the burner whereby the head is quickly and thoroughly heated.

A number of heads of different sizes and shapes will be provided and they may be used interchangeably so that the tool may be instantly adapted to the character of the particular work to be done.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. A soldering iron comprising a hollow body having an air inlet at one end, a fuel outlet in its opposite end, and a fuel inlet in its side near said end, a valve disposed transversely in the end of the body and controlling the flow through the fuel outlet, a stem projecting from the end of the body containing the fuel outlet, a soldering head detachably secured on the end of said stem, and a burner tube secured to the end of the body and surrounding the stem between the body and the head.

2. A soldering iron comprising a hollow body having an air inlet at one end, a fuel outlet in its opposite end, a fuel inlet in its side near said end, a valve disposed transversely in the end of the body and controlling the flow through the fuel outlet, a stem projecting from the end of the body containing the fuel outlet and provided with a threaded extremity, a soldering head having a threaded socket in its end adapted to engage the threaded extremity of said end, and a burner secured to the end of the body and surrounding the stem between the body and the head.

3. A soldering iron comprising a hollow body having an air inlet at one end, a fuel outlet at its opposite end and a fuel inlet in its side near one end, a valve disposed transversely in the end of the body and controlling the flow through the fuel outlet, a stem projecting from the end of the body containing the fuel outlet, a soldering head on the end of said stem, a burner tube secured to the end of the body and spaced from and surrounding the stem between the body and the head, and an initial ignition pan in the said burner tube.

In testimony whereof I have hereunto set my hand in presence of two subscribing witnesses.

ARTHUR J. WHITBECK.

Witnesses:
ALFRED E. MAGNELL,
MYRON D. STOCKWELL.

---

Copies of this patent may be obtained for five cents each, by addressing the "Commissioner of Patents, Washington, D. C."